US010668843B2

(12) United States Patent
Sztajnert (10) Patent No.: US 10,668,843 B2
(45) Date of Patent: Jun. 2, 2020

(54) FASTENING DEVICE FOR A VEHICLE SEAT BOTTOM

(71) Applicant: Faurecia Automotive Seating, LLC, Auburn Hills, MI (US)

(72) Inventor: Bartlomiej Sztajnert, Lodz (PL)

(73) Assignee: FAURECIA AUTOMOTIVE SEATING, LLC, Auburn Hills, MI (US)

(*) Notice: Subject to any disclaimer, the term of this patent is extended or adjusted under 35 U.S.C. 154(b) by 45 days.

(21) Appl. No.: 16/017,411

(22) Filed: Jun. 25, 2018

(65) Prior Publication Data

US 2019/0389349 A1    Dec. 26, 2019

(51) Int. Cl.
*B60N 2/68* (2006.01)
*B60N 2/06* (2006.01)

(52) U.S. Cl.
CPC ............. *B60N 2/682* (2013.01); *B60N 2/06* (2013.01); *B60N 2/686* (2013.01)

(58) Field of Classification Search
CPC .......... B60N 2/682; B60N 2/686; B60N 2/06; B60N 2002/684
USPC ...................................................... 297/344.1
See application file for complete search history.

(56) References Cited

U.S. PATENT DOCUMENTS

| 3,989,298 A * | 11/1976 | Cycowicz ............... A47C 4/02 |
| | | 297/342 |
| 6,059,369 A | 5/2000 | Bateson et al. |
| 6,199,252 B1 | 3/2001 | Masters et al. |
| 6,322,148 B1 * | 11/2001 | Kolena ................... B60N 2/682 |
| | | 297/354.12 |
| 2003/0209929 A1 * | 11/2003 | Muin ..................... B60N 2/3009 |
| | | 297/331 |
| 2008/0039690 A1 | 2/2008 | Zubiate et al. |
| 2008/0303332 A1 * | 12/2008 | Dudash .................... B60N 2/20 |
| | | 297/378.1 |

(Continued)

FOREIGN PATENT DOCUMENTS

| DE | 102008030608 A1 | 2/2009 |
| DE | 102007058331 A1 | 6/2009 |

(Continued)

OTHER PUBLICATIONS

German Search Report corresponding to German application No. 102019116766, dated Oct. 18, 2019, 10 pages.

*Primary Examiner* — Mark R Wendell
(74) *Attorney, Agent, or Firm* — Reising Ethington P.C.

(57) ABSTRACT

A vehicle seat bottom comprises a seat cushion support pan including first and second arms respectively coupled to first and second lateral brackets of a seat bottom support frame by a pair of first and second fastening devices that extend in opposing transverse directions from the first and second lateral brackets. Each of the arms of the seat cushion support pan includes a ramped portion at a distal end thereof extending to a slot. Each of the fastening devices includes a transverse neck terminating in a head. In assembly, the heads of the first and second fastening devices snap through the slots in the first and second arms of the seat cushion support pan, and chamfered surfaces of the necks of the first and second fastening devices guide rotation of the seat cushion support pan around a pivot axis defined by the necks of the first and second fastening devices.

19 Claims, 8 Drawing Sheets

(56) References Cited

U.S. PATENT DOCUMENTS

2016/0144747 A1     5/2016  Enns et al.
2018/0050618 A1*    2/2018  Schanderl ................ B60N 2/22
2018/0154798 A1     6/2018  Römer

FOREIGN PATENT DOCUMENTS

| DE | 202009009291 U1 | 9/2009 |
| DE | 102011009211 A1 | 7/2012 |
| DE | 102011120856 A1 | 6/2013 |
| DE | 102013106410 A1 | 12/2014 |
| DE | 102016123681 A1 | 6/2018 |
| FR | 2842476 * | 1/2004 |

* cited by examiner

FASTENING DEVICE FOR A VEHICLE SEAT BOTTOM

TECHNICAL FIELD

The present disclosure relates to a vehicle seat and, in particular, to a vehicle seat bottom including a fastening device for coupling a seat cushion support pan to a seat bottom support frame of the vehicle seat bottom.

BACKGROUND

Vehicle seats oftentimes include a seat base adapted for mounting to a floor of a vehicle body, a seat bottom supported by the seat base, and a seat back coupled to and extending up from the seat base. The seat bottom may include a support frame, a seat pan pivotally coupled to the support frame, and one or more layers of padding, foam, or other cushioning overlying the support frame and the seat pan. It may be desirable for the various components of the vehicle seat to retain their structural integrity and interconnectivity in the event of an impact upon the vehicle seat.

SUMMARY

In accordance with one or more embodiments, a vehicle seat bottom comprises a seat bottom support frame and a seat cushion support pan coupled to the seat bottom support from by a pair of first and second fastening devices. The seat bottom support frame defines an inner cavity and includes a pair of first and second lateral brackets and a transverse support beam extending between the first and second lateral brackets. Each of the first and second lateral brackets of the seat bottom support frame has a front end, a rear end, and a sidewall extending between its front and rear ends. The pair of first and second fastening devices are located between the front and rear ends of the first and second lateral brackets and extend in opposing transverse directions respectively from the sidewalls of the first and second lateral brackets toward the inner cavity. Each of the first and second fastening devices includes a transverse neck terminating in a head. Each of the transverse necks extends away from one of the side walls toward the inner cavity, and each of the heads extends in an upward direction from its associated neck and defines a sloped surface. The seat cushion support pan includes a closed end and an open end defined by a pair of first and second arms terminating in a transverse bight. Each of the first and second arms includes a ramped portion at a distal end thereof extending to a slot, with each of the ramped portions defining an engagement surface. The first and second arms of the seat cushion support pan are respectively coupled to the first and second lateral brackets by the first and second fastening devices. In assembly, the heads of the first and second fastening devices snap through the slots in the first and second arms of the seat cushion support pan. In addition, in assembly, chamfered surfaces of the necks of the first and second fastening devices engage opposing inner surfaces of the slots in the first and second arms to guide rotation of the seat cushion support pan around a pivot axis defined by the necks of the first and second fastening devices.

In some embodiments, the necks and heads of the first and second fastening devices restrain movement of the seat cushion support pan relative to the seat bottom support frame.

In some embodiments, the heads of the first and second fastening devices each include a plurality of reinforcing ribs along their sloped surfaces.

In some embodiments, the vehicle seat bottom comprises first and second mounting members respectively mounted to the first and second lateral brackets of the seat bottom support frame between the front and rear ends thereof. Each of the first and second mounting members may include a saddle and a gate pivotally coupled to the saddle. Each of the first and second fastening devices may be defined by a portion of one of the saddles and a portion of one of the gates.

In some embodiments, each saddle of the first and second mounting members may include a seat portion and a flap portion extending from the seat portion. The seat portion may extend along an upper surface of one of the lateral brackets and the flap portion may extend along an inner surface of the lateral bracket. Each gate may include a backstop and a cantilever with an engagement finger.

In some embodiments, the flap portion of each saddle may include an aperture, a ledge, and a protrusion, with each ledge extending from an upper end of one of the apertures and each protrusion extending in a downward direction from a lower end of one of the ledges.

In some embodiments, after the first and second mounting members are seated on the first and second lateral brackets of the seat bottom support frame, the first and second mounting members may be respectively coupled to the first and second lateral brackets by pivoting the gates toward the flap portions of the saddles such that the cantilevers pass through the apertures in the flap portions of the saddles and the engagement fingers of the cantilevers engage the protrusions extending from the ledges to lock the gate in position adjacent the saddle. Each of the first and second fastening devices may be defined by one of the ledges and a corresponding one of the cantilevers.

In some embodiments, each of the side walls may include an opening with an overhanging hook located between the front and rear ends of the first and second lateral brackets, and the flap portions of each of the saddles may be at least partially supported by upper surfaces of the hooks.

In some embodiments, when the first and second mounting members are coupled to the first and second lateral brackets by pivoting the gates toward the flap portions of the saddles, each of the cantilevers may pass through one of the openings in the sidewalls prior to passing through one of the apertures in the flap portions of the saddles.

In some embodiments, the vehicle seat bottom comprises a seat base adapted for mounting to a vehicle body. The seat bottom support frame may be supported by the seat base.

In some embodiments, the seat base may comprise seat rails that accommodate sliding movement of the seat bottom support frame relative to the vehicle body.

In some embodiments, the vehicle seat bottom comprises a cushion overlying the seat cushion support pan.

In accordance with one or more embodiments, a method of assembling the vehicle seat bottom may comprise multiple steps. In step (a), the seat cushion support pan may be oriented in a vertical position adjacent the seat bottom support frame such that the slots in the first and second arms of the seat cushion support pan are respectively vertically aligned with the heads of the first and second fastening devices. In step (b), the seat cushion support pan may be moved in a downward direction such that the engagement surfaces of the ramped portions of the first and second arms contact and slide over the sloped surfaces of the heads of the first and second fastening devices and the distal ends of the first and second arms are deflected toward each other. In step (c), movement of the seat cushion support pan may continue in the downward direction until the heads of the first and second fastening devices are vertically and horizontally aligned with and respectively snap through the slots in the first and second arms of the seat cushion support pan. Thereafter, in step (d), the seat cushion support pan may be rotated around the pivot axis defined by the necks of the first and second fastening devices until the seat cushion support pan is oriented in a horizontal position. During steps (b) and (c), the ramped portions of the first and second arms may cradle the heads of the first and second fastening devices and guide the slots in the first and second arms into vertical alignment with the heads of the first and second fastening devices. In addition, during steps (b) and (c), the sloped surfaces of the heads of the first and second fastening devices may deflect the ramped portions of the first and second arms toward the inner cavity and toward one another as the seat cushion support pan is moved in the downward direction.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Exemplary embodiments will hereinafter be described in conjunction with the appended drawings, wherein like designations denote like elements, and wherein.

DETAILED DESCRIPTION

The vehicle seat bottom described below includes a pair of first and second fastening devices that respectively couple first and second arms of a seat cushion support pan to first and second lateral brackets of a seat bottom support frame. The first and second fastening devices each include a transverse neck terminating in a head and are respectively mounted on the first and second lateral brackets of the seat bottom support frame between the from and rear ends thereof. Coupling the first and second arms of the seat cushion support pan to the first and second lateral brackets involves a first stage in which the seat cushion support pan is oriented in a vertical position and a second stage in which the seat cushion support pan is moved to a horizontal position by rotating the seat cushion support pan around a pivot axis defined by the transverse necks of the first and second fastening devices. During the first stage, the first and second arms of the seat cushion support pan are vertically aligned respectively with the first and second fastening devices and are moved in a downward direction such that distal ends of the first and second arms contact and slide over sloped surfaces of the heads of the first and second fastening devices and are deflected toward each other until the heads of the first and second fastening devices are aligned with and respectively snap through slots in the distal ends of the first and second arms of the seat cushion support pan. Chamfered surfaces of the necks of the first and second fastening devices may engage opposing inner surfaces of the slots in the arms of the seat cushion support pan to help guide rotation of the seat cushion support pan around the pivot axis during the second stage. The first and second fastening devices can effectively retain the seat cushion support pan in the horizontal position and prevent decoupling of the first and second arms of the seat cushion support pan from the first and second lateral support brackets of the seat bottom support frame in the event of a rear impact.

Figure 1:
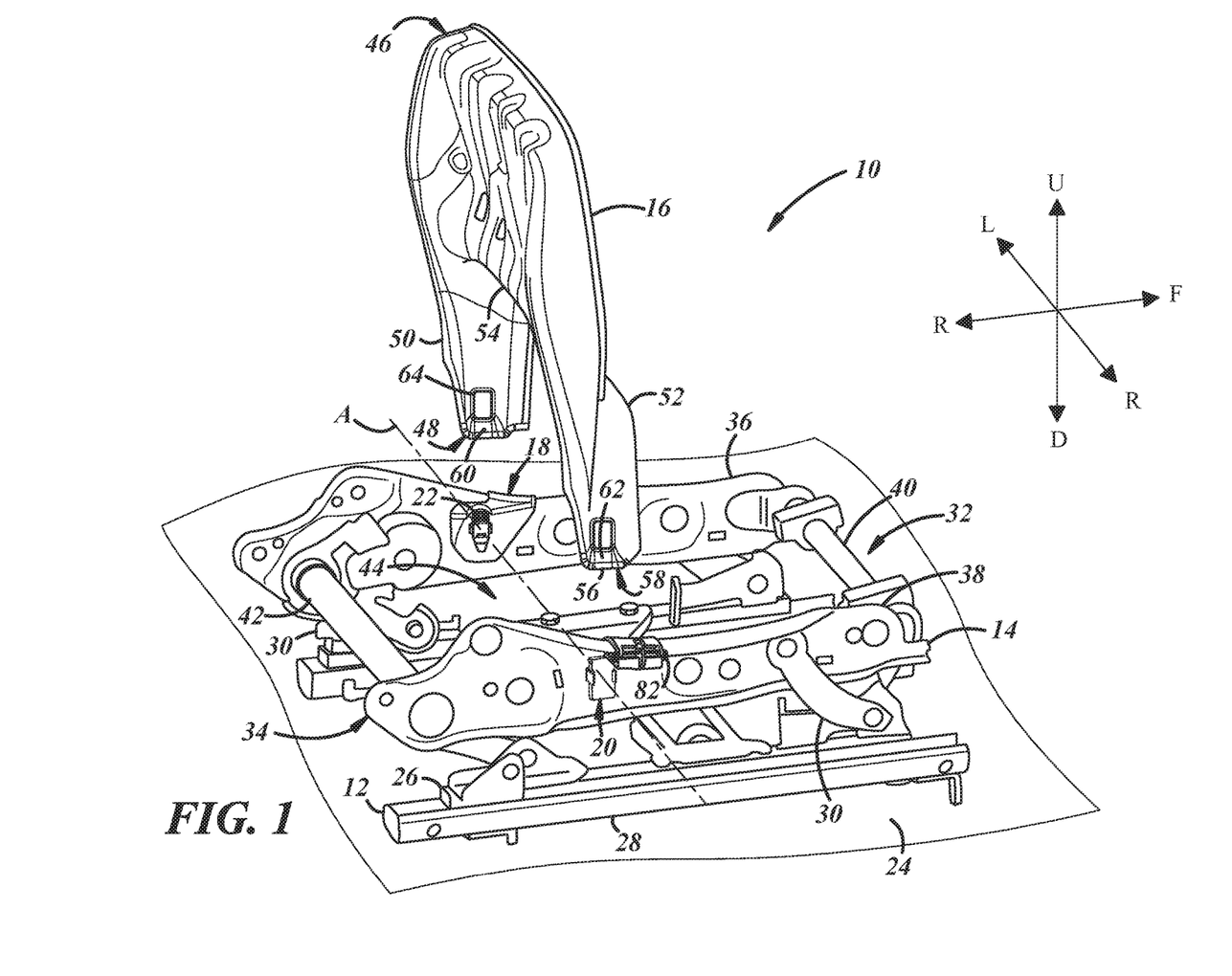
FIG. 1 is a perspective view of an embodiment of a vehicle seat bottom including a seat bottom support frame defining an inner cavity and a pair of first and second fastening devices defined by a pair of first and second mounting members for coupling a seat cushion support pan to the seat bottom support frame.

FIG. 1 illustrates an exemplary vehicle seat bottom 10 adapted for installation in a cabin of a vehicle (not shown). The vehicle seat bottom 10 supports the majority of the weight of a seat occupant when in use and includes a seat base 12, a seat bottom support frame 14, a seat cushion support pan 16, and a pair of first and second mounting members 18, 20 mounted on opposite first and second sides (or left and right sides) of the seat bottom support frame 14. The first and second mounting members 18, 20 respectively define a first fastening device 22 and a second fastening device (not shown). Forward (F) and rearward (R) directions are designated in FIG. 1 and may be referred to as horizontal directions. Upward (U) and downward (D) directions may be referred to as vertical directions, while left (L) and right (R) may be referred to as transverse directions. These directions are with respect to the seat bottom 10 and not necessarily with the vehicle in which the seat bottom 10 is installed.

The seat base 12 is adapted for mounting to a floor 24 of a vehicle body (not shown) and may include an upper track 26 and a lower track 28. The lower track 28 may be secured to the floor 24 of the vehicle body and the upper track 26 may be slidably coupled to the lower track 28 to allow for forward and rearward movement of the upper track 26 (and the seat bottom support frame 14) relative to the floor 24 of the vehicle body.

The seat bottom support frame 14 is supported by the seat base 12 and may be coupled thereto by one or more linking members 30, which may allow for upward and downward movement of the seat bottom support frame 14 relative to the floor 24 of the vehicle body. The seat bottom support frame 14 includes a front end 32, a rear end 34, a pair of first and second lateral brackets 36, 38, and a pair of front and rear transverse support beams 40, 42. Together, the first and second lateral brackets 36, 38 and the front and rear transverse support beams 40, 42 define an inner cavity 44. The seat bottom support frame 14, including the lateral brackets 36, 38 and the transverse support beams 40, 42, may be formed from a metallic material, such as a steel alloy. For example, each of the lateral brackets 36, 38 may be formed from a stamped metal sheet.

Figure 5:
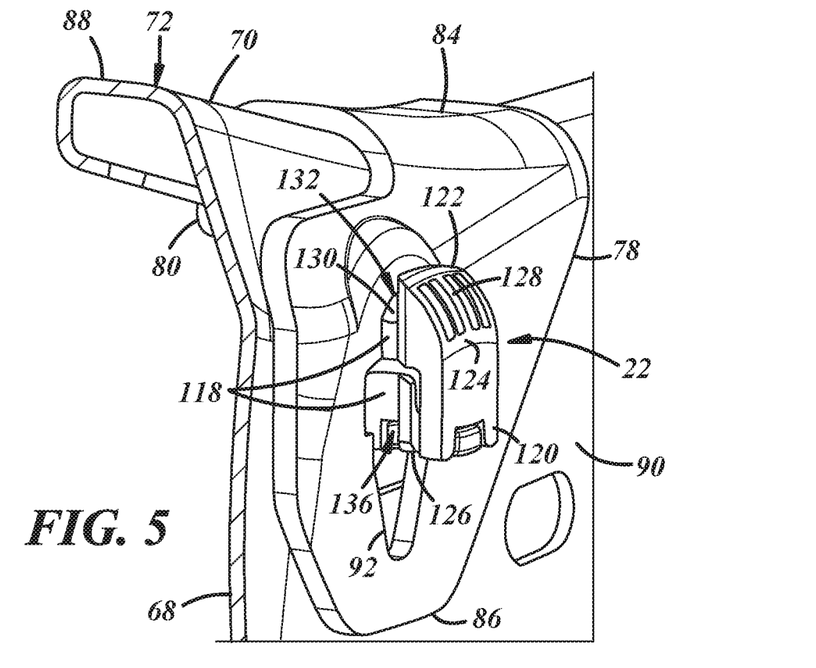
FIG. 5 is a perspective view of the first mounting member and the first lateral bracket of FIG. 4 with the gate locked in position adjacent the saddle, with a portion of the gate and a portion of the saddle defining the first fastening device.

The seat cushion support pan 16 is configured for attachment to the first and second lateral brackets 36, 38 of the seat bottom support frame 14 via the first and second fastening devices 22 and, in assembly, is oriented in a substantially horizontal position and adapted to support an overlying seat cushion (not shown). The seat cushion support pan 16 includes a closed end 46 and an open end 48 defined by a pair of first and second arms 50, 52 terminating in a transverse bight 54. Each of the first and second arms 50, 52 includes a ramped portion 56 at a distal end 58 thereof defining an inner surface 60 and an opposite outer engagement surface 62. Each of the ramps 56 extends from the distal end 58 of its associated arm 50, 52 to a slot 64 having opposing inner surfaces 66, as best shown in FIG. 5. The seat cushion support pan 16 may be formed from a metallic material, such as a steel alloy.

FIGS. 2-13 and the accompanying description thereof are specifically directed to the first lateral bracket 36 of the seat bottom support frame 14, the first arm 50 of the seat cushion support pan 16, and the first mounting member 18 mounted on the first lateral bracket 36 of the seat bottom support frame 14, all of which are located on the left side of the vehicle seat bottom 10. Due to the enantiomorphic nature of the first and second lateral brackets 36, 38, the first and second arms 50, 52, and the first and second mounting members 18, 20, the following description applies equally and oppositely to the second lateral bracket 38, the second arm 52, and the second mounting member 20 located on the right side of the vehicle seat bottom 10.

Figures 2, 2A:
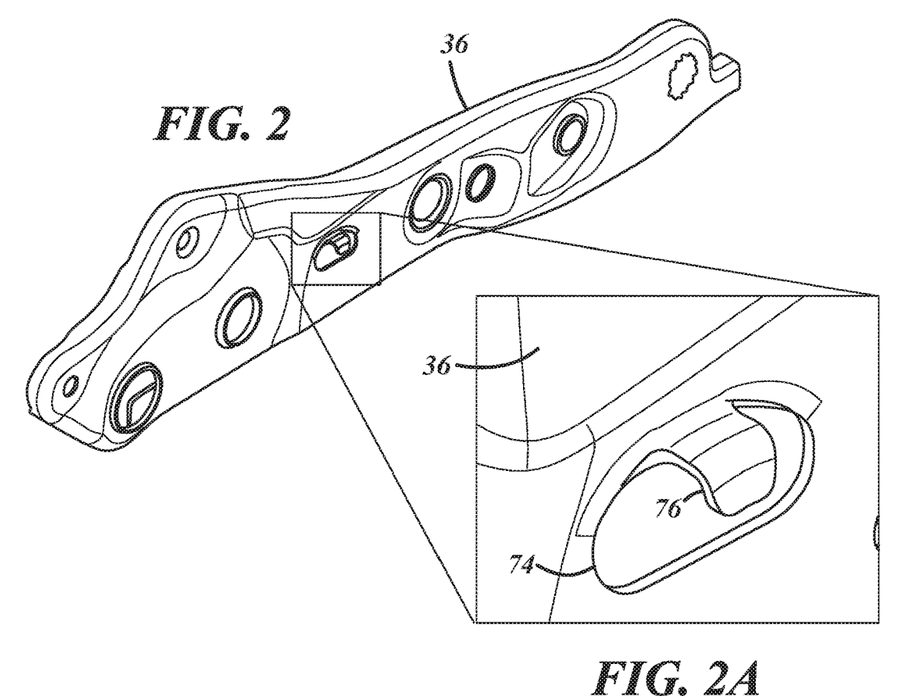
FIG. 2 is a perspective view of a first lateral bracket of the seat bottom support frame of FIG. 1.
FIG. 2A is an enlarged view of an inner portion of the first lateral bracket of FIG. 2.
Figure 4:
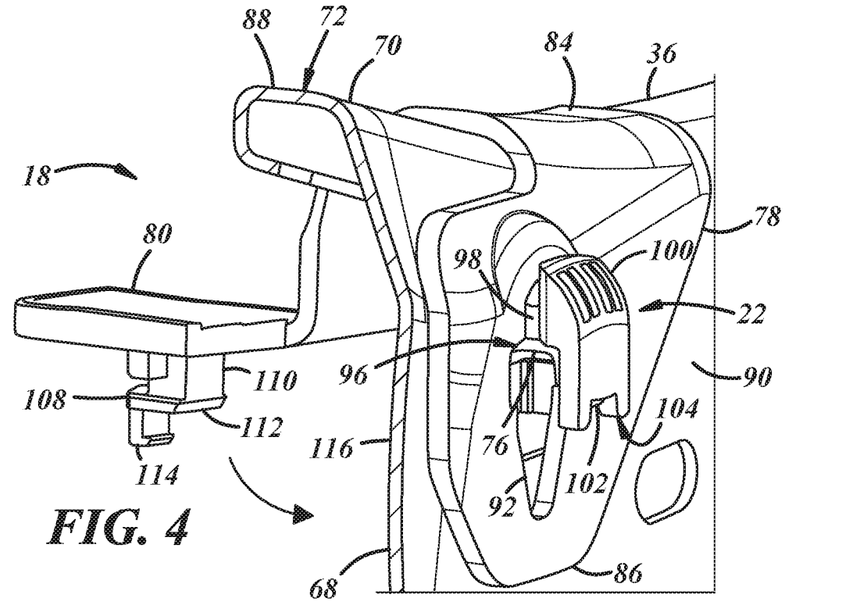
FIG. 4 is a perspective view of the first mounting member of FIG. 3 seated on the first lateral bracket of FIG. 2.

A best shown in FIGS. 2 and 4, the first lateral bracket 36 includes a sidewall 68 extending between the front and rear ends 32, 34 of the seat bottom support frame 14 and a land 70 at an upper end 72 thereof extending away from the inner cavity 44. The sidewall 68 includes an opening 74 between the front and rear ends 32, 34 of the seat bottom support frame 14 with an overhanging hook 76. In assembly, the opening 74 and the overhanging hook 76 may help guide placement of the first mounting member 18 on the first lateral bracket 36.

Figure 3:
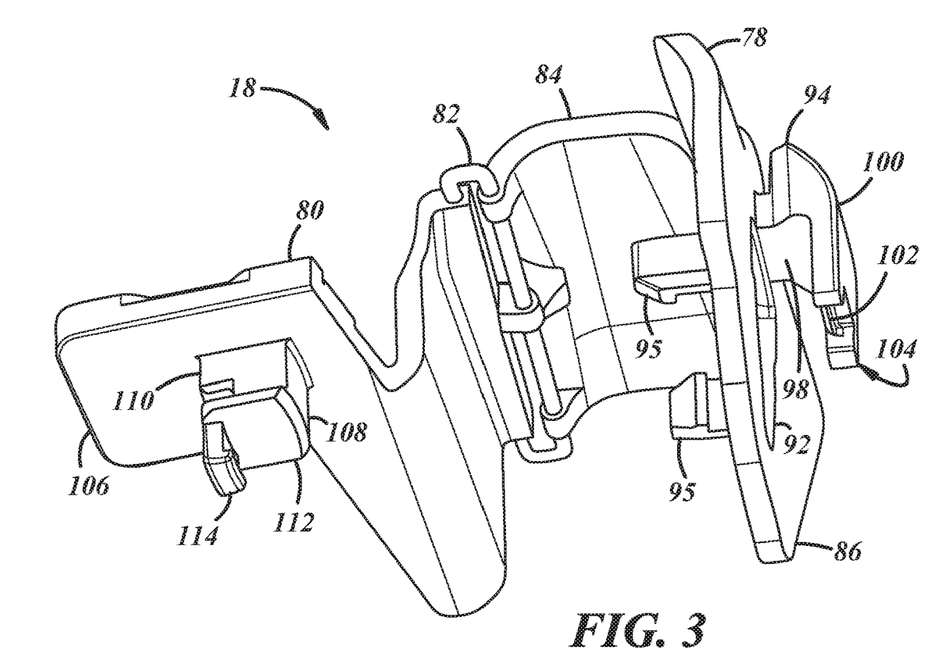
FIG. 3 is a perspective view of the first mounting member of FIG. 1, including a saddle and a gate pivotally coupled to the saddle.

Referring now to FIGS. 3 and 4, the first mounting member 18 is adapted for mounting to the first lateral bracket 36 of the seat bottom support frame 14 and includes a saddle 78 and a gate 80 pivotally coupled to the saddle 78 at an attachment joint 82. The saddle 78 includes a seat portion 84 and a flap portion 86. When the first mounting member 18 is positioned on the first lateral bracket 36, the seat portion 84 extends along an upper surface 88 of the land 70 and the flap portion 86 extends in a downward direction from the seat portion 84 along an inner surface 90 of the sidewall 68. The flap portion 86 of the saddle 78 includes an aperture 92, a ledge 94 extending from an upper end 96 of the aperture 92, and a pair of tangs 95. The ledge 94 includes a base portion 98 and a pendant portion 100 extending in both an upward direction and a downward direction from the base portion 98. A protrusion 102 extends in a downward direction from a lower end 104 of the pendant portion 100 of the ledge 94. The gate 80 includes a backstop 106 and a cantilever 108 with a base portion 110, a pendant portion 112, and an engagement finger 114 at a distal end of the pendant portion 112 of the cantilever 108. The first mounting member 18, including the saddle 78 and the gate 80, may be made of a polymeric material, such as acetal or polyolefin. Of course, metal or other non-polymeric materials may also be suitable.

A best shown in FIGS. 4 and 5, after the first mounting member 18 is positioned on the first lateral bracket 36, the first mounting member 18 is coupled to the first lateral bracket 36 by pivoting the gate 80 toward the flap portion 86 of the saddle 78 so that the backstop 106 engages an exterior surface 116 of the sidewall 68 and the cantilever 108 passes through the opening 74 in the sidewall 68 and through the aperture 92 in the flap portion 86 of the saddle 78. At the same time, the tangs 95 extending from the flap portion 86 of the saddle 78 snap around the backstop 106 of the gate 80. In addition, the engagement finger 114 of the cantilever 108 of the gate 80 engages the protrusion 102 extending from the ledge 94 of the flap portion 86 of the saddle 78 and locks the gate 80 into position adjacent the saddle 78.

The first fastening device 22 extends in a transverse direction away from the inner surface 90 of the sidewall 68, toward the inner cavity 44, and is defined by a portion of the saddle 78 and a portion of the gate 80. More specifically, a first portion of the first fastening device 22 is defined by the ledge 94 of the flap portion 86 of the saddle 78 and a second portion of the first fastening device 22 is defined by the cantilever 108 of the gate 80. As best shown in FIGS. 4 and 5, in assembly, the base portion 98 of the ledge 94 and the base portion 110 of the cantilever 108 come together to define a transverse neck 118 of the first fastening device 22. At the same time, the pendant portion 100 of the ledge 94 and the pendant portion 112 of the cantilever 108 come together to define a head 120 of the first fastening device 22. The head 120 is sized for receipt within the slot 64 in the arm 50 and includes an upper catch 122 and a lower catch 126. The upper catch 122 extends in an upward direction from the neck 118 and defines a sloped surface 124. The lower catch 126 extends in a downward direction from the neck 118. The upper catch 122 may include a plurality of reinforcing ribs 128 along its sloped surface 124.

Figure 12:
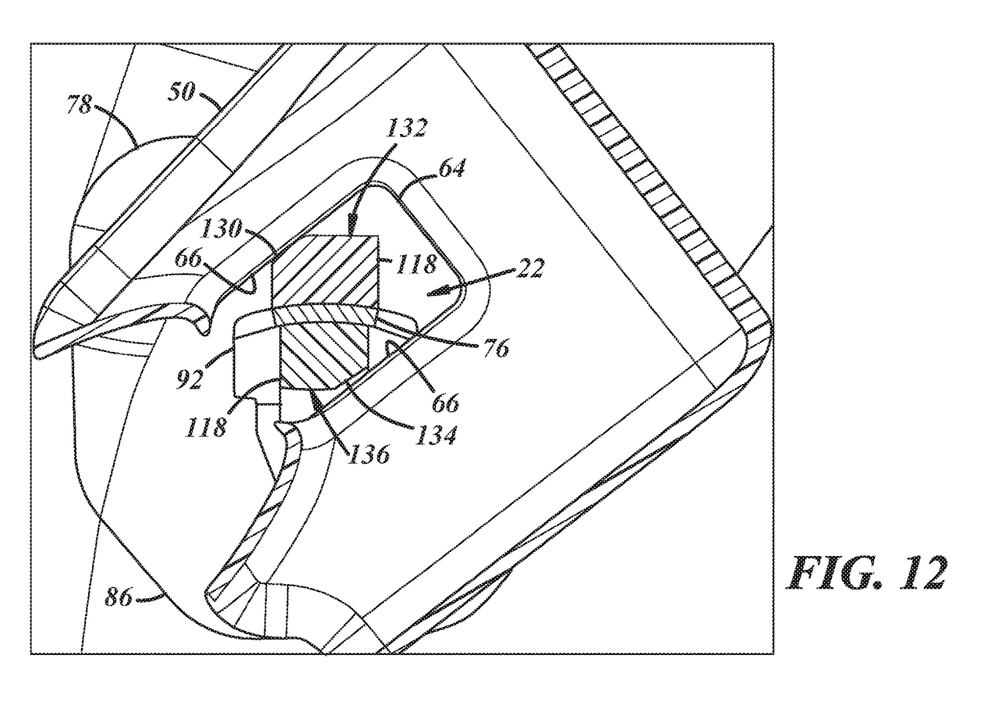
FIG. 12 is a partial cross-sectional view of the distal end of the first arm of the seat cushion support pan of FIG. 11.

The transverse necks 118 of the first and second fastening devices 22 are aligned with each other and define a pivot axis A (FIG. 1) around which the seat cushion support pan 16 rotates during assembly of the seat cushion support pan 16 on the seat bottom support frame 14. As best shown in FIGS. 5 and 12, the transverse neck 118 of the first fastening device 22 includes a first chamfered surface 130 at an upper end 132 thereof and a second chamfered surface 134 at a lower end 136 thereof. The first and second chamfered surfaces 130, 134 of the transverse neck 118 engage the opposing inner surfaces 66 of the slot 64 and guide rotation of the seat cushion support pan 16 around the pivot axis A during assembly of the seat cushion support pan 16 on the seat bottom support frame 14, as discussed below.

In FIGS. 3-13, the first and second fastening devices 22 are defined by the first and second mounting members 18, 20. As such, the first and second fastening devices 22 are mounted to the first and second lateral brackets 36, 38 along with the first and second mounting members 18, 20 by virtue of their physical relationship therewith. However, in other embodiments, the first and second fastening devices 22 may be defined separately from the first and second mounting members 18, 20. In such case, the first and second fastening devices 22 may be mounted to the first and second lateral brackets 36, 38 by other attachment features.

Figure 6:
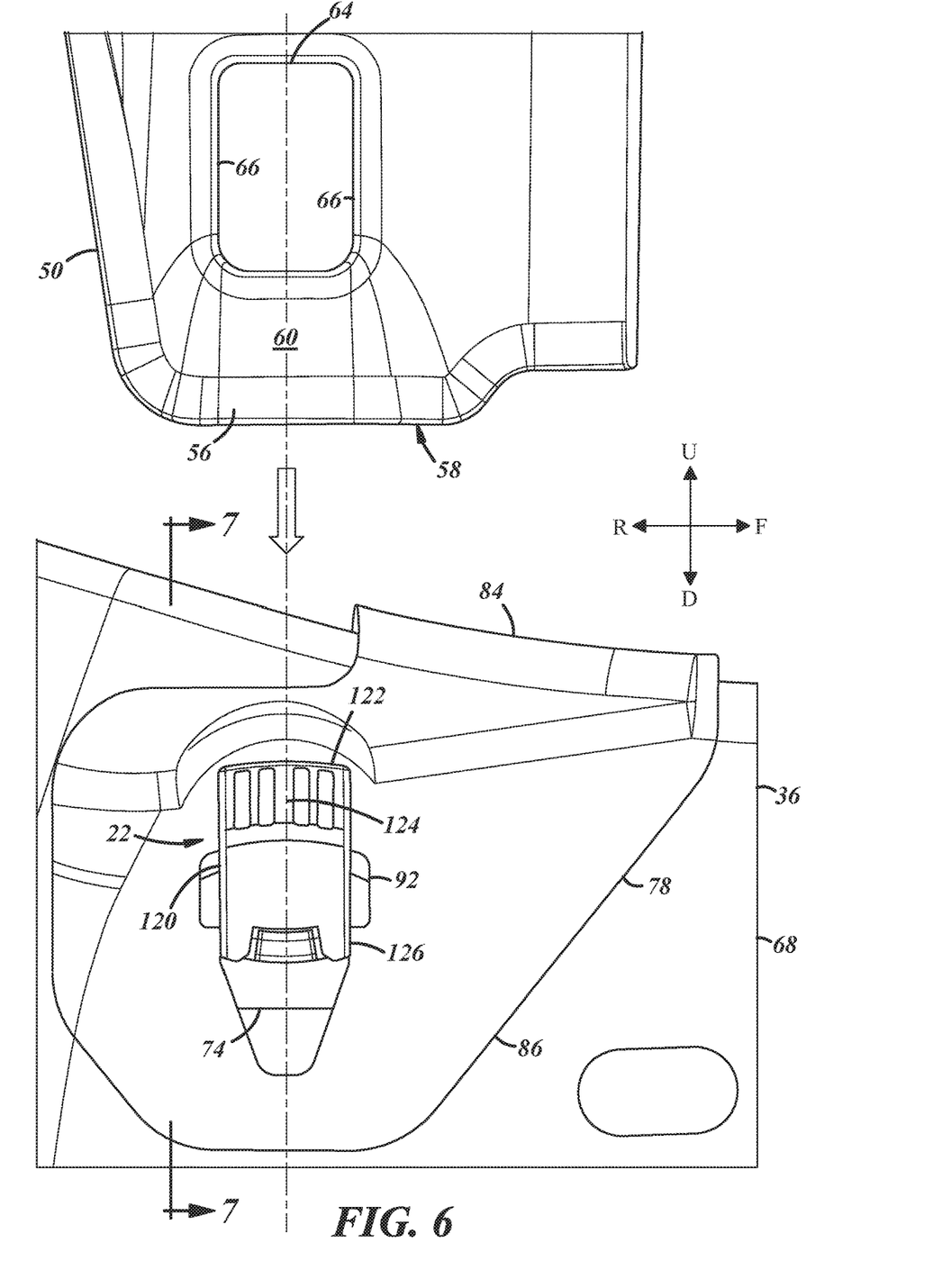
FIG. 6 is a side view of the first mounting member and the first lateral bracket of FIG. 5 and a distal end of a first arm of the seat cushion support pan of FIG. 1 oriented in a vertical position and including a ramped portion extending to a slot, wherein the slot in the first arm of the seat cushion support pan is in vertical alignment with a head of the first fastening device.
Figure 7:
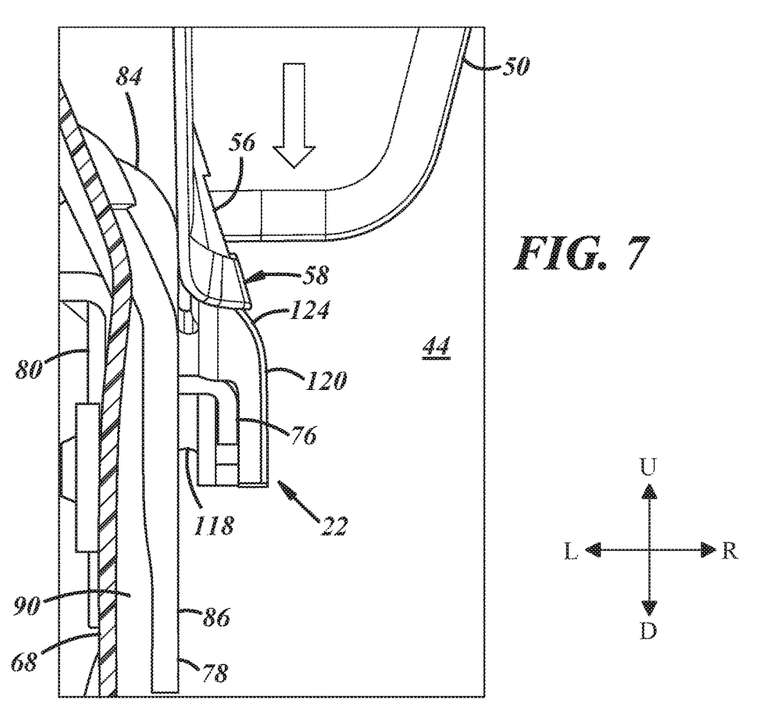
FIGS. 7 and 8 are partial cross-sectional views of the first lateral bracket of FIG. 6 taken along line 7-7 of FIG. 6 and depicting movement of the distal end of the first arm of the seat cushion support pan as the ramped portion of the arm slides over the head of the first fastening device and is deflected toward the inner cavity defined by the seat bottom support frame of FIG. 1.
Figure 8:
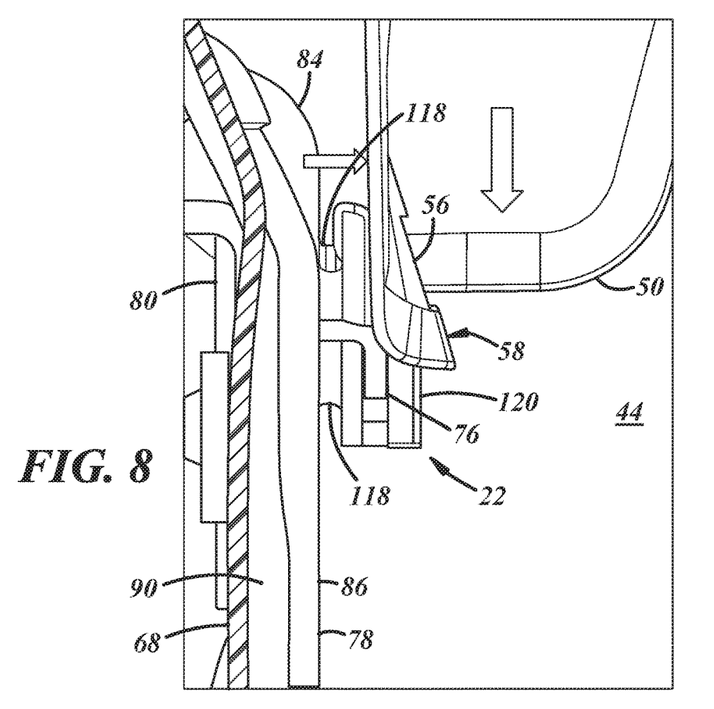
Figure 9:
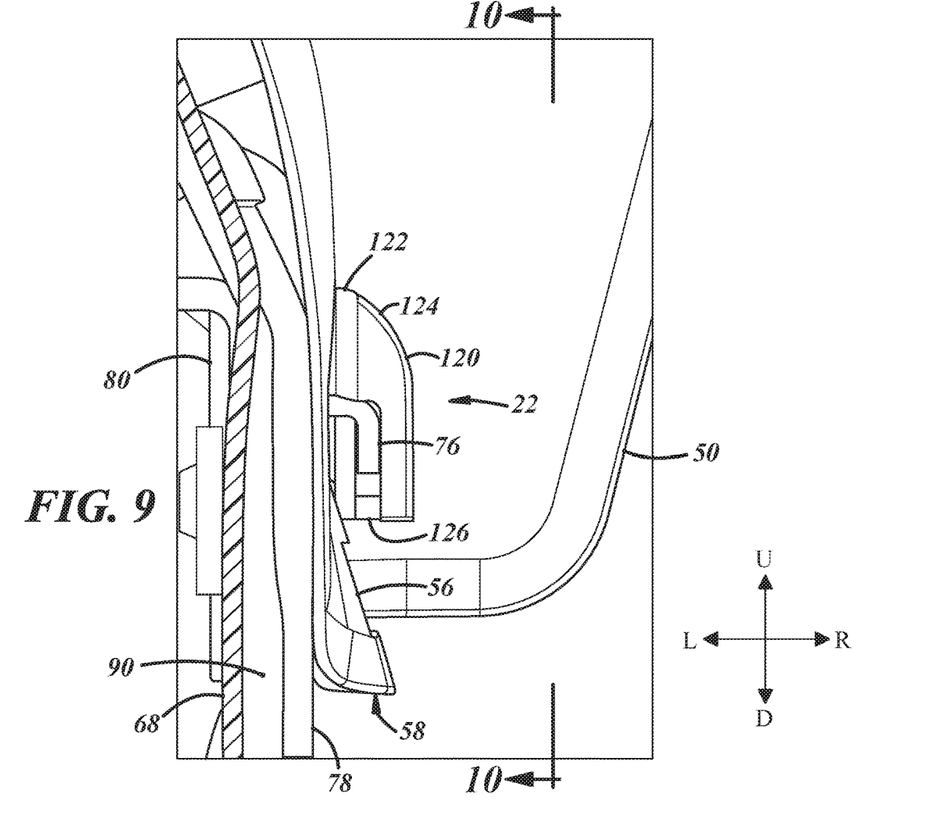
FIG. 9 is a partial cross-sectional view of the first lateral bracket of FIG. 7 after the head of the first fastening device has snapped through the slot in the distal end of the first arm of the seat cushion support pan.
Figure 10:
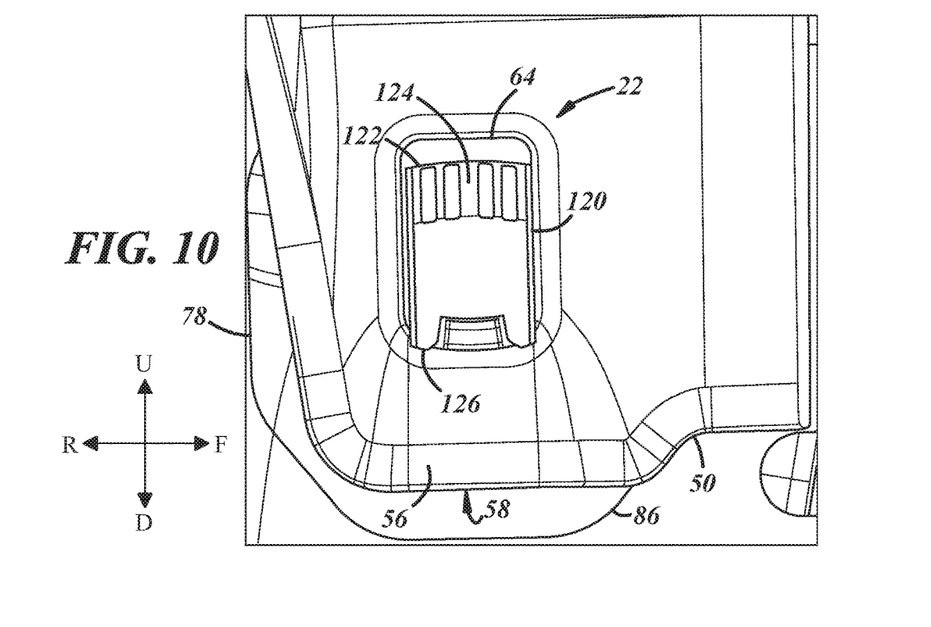
FIG. 10 is a side view of the first lateral bracket, the first fastening device, and the distal end of the first arm of the seat cushion support pan taken along line 10-10 of FIG. 9.

Referring now to FIGS. 6-10, after the first fastening device 22 is mounted on the first lateral bracket 36 (and the second fastening device is mounted on the second lateral bracket 38), the seat cushion support pan 16 is oriented in a vertical position (FIG. 1). In addition, the distal ends 58 of the first and second arms 50, 52 of the seat cushion support pan 16 are positioned respectively adjacent and in vertical alignment with the first and second fastening devices 22, as best shown in FIGS. 1 and 6. Thereafter, the first arm 50 (and the second arm 52) of the seat cushion support pan 16 is moved in a downward direction so that the outer engagement surface 62 (FIG. 1) of the ramped portion 56 at the distal end 58 of the arm 50 contacts and slides over the sloped surface 124 of the head 120 of the first fastening device 22. The ramped portion 56 of the arm 50 is adapted to cradle the head 120 of the first fastening device 22 and to guide movement of the arm 50 in the downward direction so that the slot 64 in the arm 50 remains in vertical alignment with the head 120 of the first fastening device 22. At the same time, the sloped surface 124 of the head 120 of the first fastening device 22 is configured to deflect the ramped portion 56 of the arm 50 away from the sidewall 68 of the first lateral bracket 36, toward the inner cavity 44. Therefore, as the first and second arms 50, 52 of the seat cushion support pan 16 are moved in the downward direction, the distal ends 58 of each of the first and second arms 50, 52 are deflected toward each other in opposite transverse directions toward the inner cavity 44, as best shown in FIGS. 7 and 8. Further downward movement of the arm 50 (and the arm 52) leads to further deflection of the ramped portion 56 of the arm 50 toward the inner cavity 44 until the head 120 of the first fastening device 22 is vertically and horizontally aligned with the slot 62 in the arm 50 and snaps therethrough, as shown in FIGS. 9 and 10.

Figure 11:
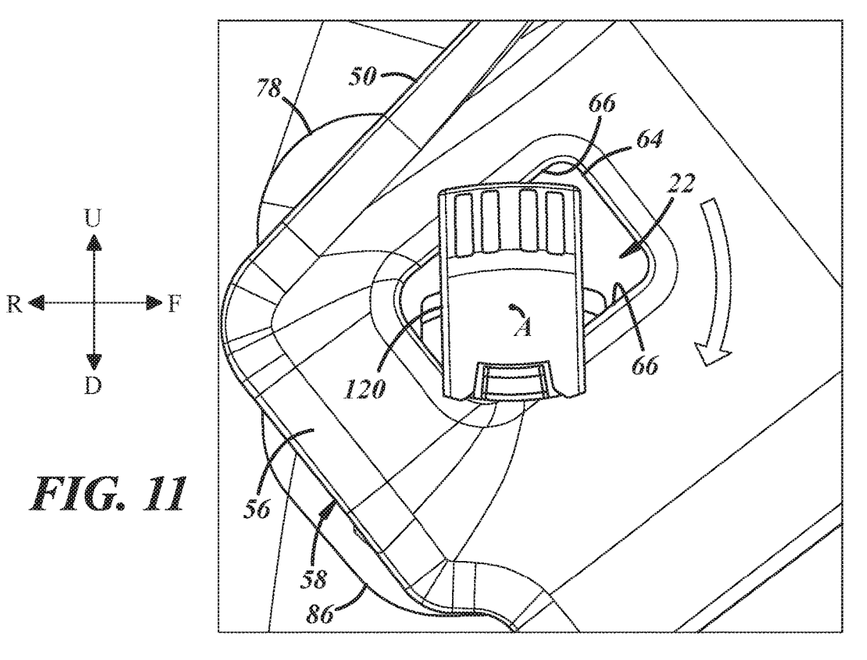
FIG. 11 is a side view of the first lateral bracket, the first fastening device, and the distal end of the first arm of the seat cushion support pan of FIG. 10 during rotation of the seat cushion support pan around a pivot axis defined by the head of the first fastening device.
Figure 13:
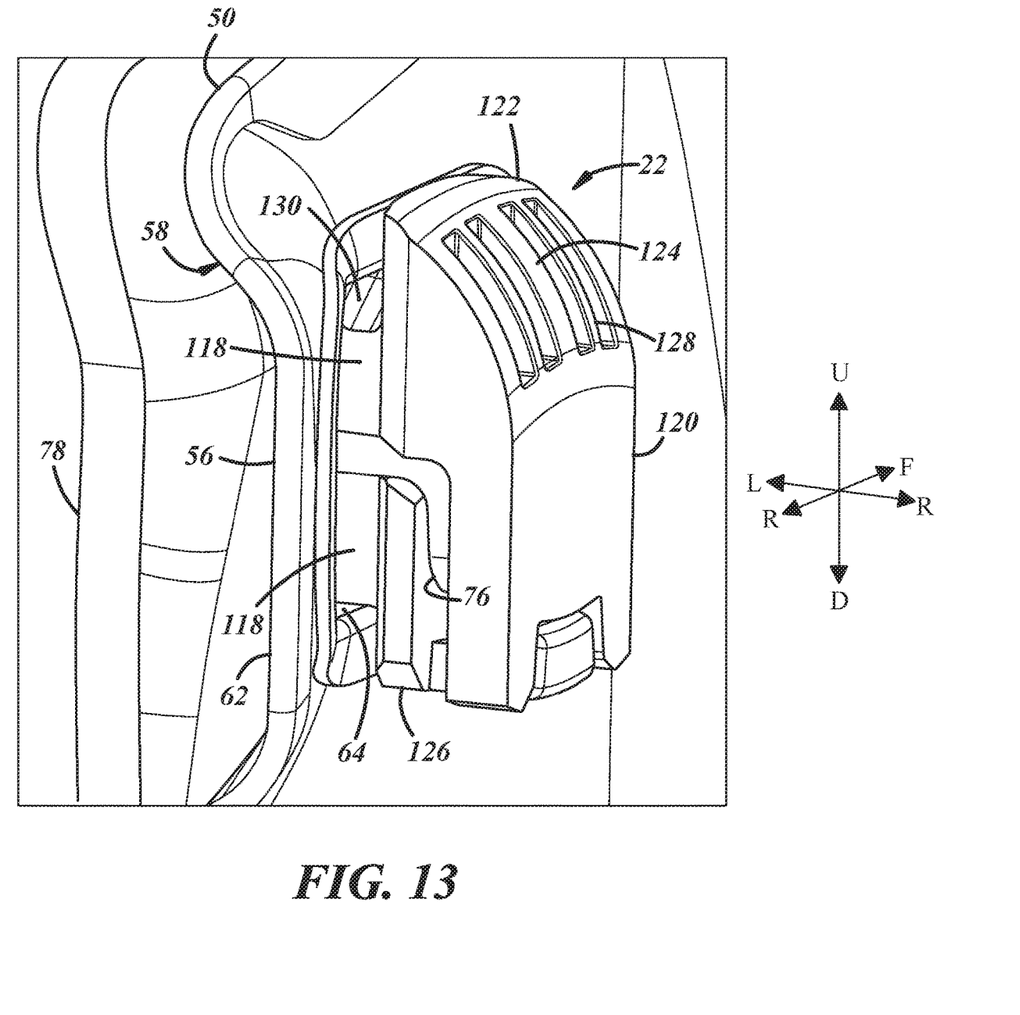
FIG. 13 is a perspective view of the first lateral bracket, the first fastening device, and the distal end of the first arm of the seat cushion support pan of FIG. 11 after the seat cushion support pan has been rotated from a vertical position to a horizontal position.

Referring now to FIGS. 11-13, once the head 120 of the first fastening device 22 snaps through the slot 62 in the arm 50 of the seat cushion support pan 16, the seat cushion support pan 16 is moved to a horizontal position (FIG. 13) by rotating the seat cushion support pan 16 around the pivot axis A. During rotation of the seat cushion support pan 16, the first and second chamfered surfaces 130, 134 of the transverse neck 118 engage the inner surfaces 66 of the slot 64 and guide rotation of the seat cushion support pan 16 around the pivot axis A. In the horizontal position, the closed end 46 of the seat cushion support pan 16 may rest against the front end 32 of the seat bottom support frame 14 or another component of the seat bottom 10. After the seat cushion support pan 16 is rotated into the horizontal position, the neck 118 and the upper and lower catches 122, 126 of the head 120 limit movement of the seat cushion support pan 16 in the horizontal and vertical directions relative to the seat bottom support frame 14. In addition, transverse movement of the seat cushion support pan 16 relative to the seat bottom support frame 14 is restrained and/or prevented due to placement of the distal ends 58 of the arms 50, 52 between the first and second lateral brackets 36, 38.

The vehicle seat bottom 10 may include other components not explicitly illustrated in the figures, such as an overlying seat cushion and/or a decorative trim cover. In addition, in practice, a vehicle seat back may be coupled to the vehicle seat bottom 10 to form a vehicle seat.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle seat bottom comprising:
   a seat bottom support frame defining an inner cavity and including a pair of first and second lateral brackets and a transverse support beam extending between the first and second lateral brackets, each of the first and second lateral brackets having a front end, a rear end, and a sidewall extending between the front and rear ends;
   a pair of first and second fastening devices located between the front and rear ends of the first and second lateral brackets and extending in opposing transverse directions respectively from the sidewalls of the first and second lateral brackets toward the inner cavity, each of the first and second fastening devices including a transverse neck extending away from one of the side walls toward the inner cavity and terminating in a head that extends in an upward direction from the neck and defines a sloped surface; and
   a seat cushion support pan including a closed end and an open end defined by a pair of first and second arms terminating in a transverse bight, each of the first and second arms including a ramped portion at a distal end thereof extending to a slot, with each of the ramped portions defining an engagement surface, wherein the first and second arms of the seat cushion support pan are respectively coupled to the first and second lateral brackets by the first and second fastening devices, and wherein, in assembly, the heads of the first and second fastening devices snap through the slots in the first and second arms of the seat cushion support pan and chamfered surfaces of the necks of the first and second fastening devices engage opposing inner surfaces of the slots in the first and second arms to guide rotation of the seat cushion support pan from a vertical position to a horizontal position relative to the first and second fastening devices around a pivot axis defined by the necks of the first and second fastening devices.

2. A vehicle seat bottom as defined in claim 1, wherein the necks and heads of the first and second fastening devices restrain movement of the seat cushion support pan relative to the seat bottom support frame.

3. A vehicle seat bottom as defined in claim 1, wherein the heads of the first and second fastening devices each include a plurality of reinforcing ribs along their sloped surfaces.

4. A vehicle seat bottom as defined in claim 1, further comprising first and second mounting members respectively mounted to the first and second lateral brackets of the seat bottom support frame between the front and rear ends thereof, each of the first and second mounting members including a saddle and a gate pivotally coupled to the saddle, wherein each of the first and second fastening devices is defined by a portion of one of the saddles and a portion of one of the gates.

5. A vehicle seat bottom as defined in claim 4, wherein each saddle includes a seat portion and a flap portion extending from the seat portion, the seat portion extending along an upper surface of one of the lateral brackets and the flap portion extending along an inner surface of the lateral bracket, and wherein each gate includes a backstop and a cantilever with an engagement finger.

6. A vehicle seat bottom as defined in claim 5, wherein the flap portion of each saddle includes an aperture, a ledge, and a protrusion, and wherein the ledge extends from an upper end of the aperture and the protrusion extends in a downward direction from a lower end of the ledge.

7. A vehicle seat bottom as defined in claim 6, wherein, after the first and second mounting members are seated on the first and second lateral brackets of the seat bottom support frame, the first and second mounting members are respectively coupled to the first and second lateral brackets by pivoting the gates toward the flap portions of the saddles such that the cantilevers pass through the apertures in the flap portions of the saddles and the engagement fingers of the cantilevers engage the protrusions extending from the ledges to lock the gate in position adjacent the saddle.

8. A vehicle seat bottom as defined in claim 7, wherein each of the first and second fastening devices is defined by one of the ledges and a corresponding one of the cantilevers.

9. A vehicle seat bottom as defined in claim 7, wherein each of the side walls includes an opening with an overhanging hook located between the front and rear ends of the first and second lateral brackets, and wherein the flap portions of each of the saddles are at least partially supported by upper surfaces of the hooks.

10. A vehicle seat bottom as defined in claim 9, wherein, when the first and second mounting members are coupled to the first and second lateral brackets by pivoting the gates toward the flap portions of the saddles, each of the cantilevers pass through one of the openings in the sidewalls prior to passing through one of the apertures in the flap portions of the saddles.

11. A vehicle seat bottom as defined in claim 1, further comprising a seat base adapted for mounting to a vehicle body, and wherein the seat bottom support frame is supported by the seat base.

12. A vehicle seat bottom as defined in claim 11, wherein the seat base comprises seat rails that accommodate sliding movement of the seat bottom support frame relative to the vehicle body.

13. A vehicle seat bottom as defined in claim 1, further comprising a cushion overlying the seat cushion support pan.

14. A method of assembling the vehicle seat bottom of claim 1 including:
(a) orienting the seat cushion support pan in a vertical position adjacent the seat bottom support frame such that the slots in the first and second arms of the seat cushion support pan are respectively vertically aligned with the heads of the first and second fastening devices;
(b) moving the seat cushion support pan in a downward direction such that the engagement surfaces of the ramped portions of the first and second arms contact and slide over the sloped surfaces of the heads of the first and second fastening devices and the distal ends of the first and second arms are deflected toward each other;
(c) continuing to move the seat cushion support pan in the downward direction until the heads of the first and second fastening devices are vertically and horizontally aligned with and respectively snap through the slots in the first and second arms of the seat cushion support pan; and then
(d) rotating the seat cushion support pan around the pivot axis defined by the necks of the first and second fastening devices until the seat cushion support pan is oriented in a horizontal position,
wherein, during steps (b) and (c), the ramped portions of the first and second arms cradle the heads of the first and second fastening devices and guide the slots in the first and second arms into vertical alignment with the heads of the first and second fastening devices, and
wherein, during steps (b) and (c), the sloped surfaces of the heads of the first and second fastening devices deflect the ramped portions of the first and second arms toward the inner cavity and toward one another as the seat cushion support pan is moved in the downward direction.

15. A vehicle seat bottom comprising:
a seat bottom support frame defining an inner cavity and including a pair of first and second lateral brackets and a transverse support beam extending between the first and second lateral brackets, each of the first and second lateral brackets having a front end, a rear end, and a sidewall extending between the front and rear ends;
a pair of first and second fastening devices respectively fixedly mounted to the first and second lateral brackets of the seat bottom support frame, wherein the first and second fastening devices are fixedly mounted to the first and second lateral brackets between the front and rear ends thereof and extend in opposing transverse directions respectively from the sidewalls of the first and second lateral brackets toward the inner cavity, with each of the first and second fastening devices including a transverse neck extending away from one of the side walls toward the inner cavity and terminating in a head that extends in an upward direction from the neck and defines a sloped surface; and a seat cushion support pan including a closed end and an open end defined by a pair of first and second arms terminating in a transverse bight, each of the first and second arms including a ramped portion at a distal end thereof extending to a slot, with each of the ramped portions defining an outer engagement surface that faces away from the inner cavity in a transverse direction, wherein the first and second arms of the seat cushion support pan are respectively coupled to the first and second lateral brackets by the first and second fastening devices, and wherein, in assembly, the heads of the first and second fastening devices snap through the slots in the first and second arms of the seat cushion support pan and chamfered surfaces of the necks of the first and second fastening devices engage opposing inner surfaces of the slots in the first and second arms to guide rotation of the seat cushion support pan relative to the first and second fastening devices around a pivot axis defined by the necks of the first and second fastening devices.

16. A vehicle seat bottom as defined in claim 15 comprising: a pair of first and second mounting members respectively mounted to the first and second lateral brackets of the seat bottom support frame between the front and rear ends thereof, wherein the first and second fastening devices are respectively defined by the first and second mounting members.

17. A vehicle seat bottom as defined in claim 15, wherein, in assembly, the first and second arms of the seat cushion support pan are moved in a downward direction such that the outer engagement surfaces of the ramped portions of the first and second arms respectively contact and slide over the sloped surfaces of the transverse heads of the first and second fastening devices.

18. A vehicle seat bottom as defined in claim 17, wherein, in assembly, as the first and second arms of the seat cushion support pan are moved in the downward direction, the sloped surfaces of the transverse heads of the first and second fastening devices respectively engage the outer engagement surfaces of the ramped portions of the first and second arms such that the ramped portions of the first and second arms are respectively progressively deflected away from the sidewalls of the first and second lateral brackets toward the inner cavity until the transverse heads of the first and second fastening devices are respectively vertically and horizontally aligned with the slots in the first and second arms of the seat cushion support pan and snap therethrough.

19. A vehicle seat bottom as defined in claim 15, wherein, after the heads of the first and second fastening devices snap through the slots in the first and second arms of the seat cushion support pan, the first and second fastening devices prevent horizontal movement of the seat cushion support pan and respectively prevent decoupling of the first and second arms of the seat cushion support pan from the first and second lateral support brackets of the seat bottom support frame in the event of a rear impact.

\* \* \* \* \*